(12) United States Patent
Potenziani, II et al.

(10) Patent No.: US 7,652,626 B1
(45) Date of Patent: Jan. 26, 2010

(54) CO-LINEAR ANTENNA FOR DIRECTION FINDING

(75) Inventors: Ernest Potenziani, II, Tinton Falls, NJ (US); Michael T. Cummings, Howell, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 216 days.

(21) Appl. No.: 12/001,596

(22) Filed: Dec. 5, 2007

(51) Int. Cl.
G01S 5/04 (2006.01)
H01Q 19/06 (2006.01)
H01Q 1/48 (2006.01)
H01Q 1/40 (2006.01)

(52) U.S. Cl. .................... 342/439; 343/753; 343/846; 343/873

(58) Field of Classification Search .............. 342/439, 342/360, 417, 419, 432, 443; 343/753, 873, 343/846, 826–827, 829
See application file for complete search history.

(56) References Cited

U.S. PATENT DOCUMENTS 2,845,622 A * 7/1958 Gamble .................... 342/153

* cited by examiner

Primary Examiner—Thomas H Tarcza
Assistant Examiner—Fred H Mull
(74) Attorney, Agent, or Firm—Michael Zelenka; Stephen J. Harbulak

(57) ABSTRACT

A direction-finding co-linear antenna is provided by collinearly aligning an exposed reference antenna with a primary antenna that is surrounded by a dielectric sleeve with a predetermined thickness and the reference and primary antennas are separated by a ground plane. The direction-finding co-linear antenna provides a simple, light-weight and inexpensive arrangement with fewer antennas and reduced antenna spacing that avoids unwanted detection because of a smaller electronic footprint that consists of the area of a single antenna plus a few inches of dielectric material in the sleeves rather than four widely spaced antennas positioned in an array. The direction-finding co-linear antenna apparatus also requires less electronic processing because the antenna only needs to address the RF from two antennas rather than from four or five antennas in a conventional array arrangement. The present invention also encompasses a direction-finding co-linear antenna system and a method for determining the unknown location of a signal transmission source with a co-linear direction-finding antenna.

20 Claims, 2 Drawing Sheets

CO-LINEAR ANTENNA FOR DIRECTION FINDING

GOVERNMENT INTEREST

The invention described herein may be manufactured, used, imported, sold, and licensed by or for the Government of the United States of America without the payment to us of any royalty thereon.

FIELD OF THE INVENTION

The present invention relates to antenna devices. More particularly, the present invention relates to devices and methods providing a co-linear antenna for direction finding.

BACKGROUND OF THE INVENTION

Direction finding is the establishment of the direction from which a received signal was transmitted. By combining the directional information from two or more suitably spaced receivers, the source of a transmission can be determined through the process of triangulation. Direction finding often requires an antenna that is directional by being more sensitive in certain directions than in others and a number of antennas exhibit this property. Direction finding antennas have been used in numerous military and civilian applications such as aircraft navigation, disaster response, search and rescue, reconnaissance, signals intelligence, airborne or ground Identification of Friend or Foe (IFF) systems and law enforcement.

While direction-finding antennas have found many useful applications, they can still suffer from a number of disadvantages, shortcomings and limitations. One significant disadvantage with current direction-finding antenna systems is the antenna spacing problem typically found in antenna arrays with 4 or 5 vertical monopole or dipole antennas. It is possible to determine the Angle of Arrival by measuring the time delay or phase difference (Interferometric technique) between all antennas in the array, but in interferometric direction-finding systems, antenna spacing is dependent upon the longest RF wavelength that is being detected. In the lower VHF band, such antenna spacing can become prohibitively large. Also, in TDOA systems the antennas spacing is determined by the minimum detectable time difference and therefore the antenna spacing can again be prohibitive. Thus, there has been a long-felt need for a direction-finding antenna that reduces or eliminates antenna spacing problems, particularly in the lower VHF band.

Another disadvantage with current antenna array direction-finding systems is the relatively large footprint found when using four widely spaced antennas in an array, which, in turn, causes a number of operational and tactical problems such as unwanted detection by an adversary, as well as cumbersome and complex calibrated cable assemblies. Other disadvantages related to the excessive size and unwieldy nature of current direction-finding antenna arrays include the expense of multiple antennas, excessive weight and wind drag. Additionally, processing signals from a multiple antenna array also requires more costly and sophisticated electronics equipment.

Thus, there has been a long-felt need for direction-finding antenna systems with fewer antennas that are simpler, less costly, less cumbersome and able to avoid unwanted detection by adversaries through a reduction in antenna spacing. Up until now, this long-felt need for such direction-finding antenna apparatus has not been answered.

SUMMARY OF THE INVENTION

This invention's direction-finding co-linear antenna system answers the long-felt need for a simpler, less costly and less cumbersome direction-finding antenna system that avoids unwanted detection by adversaries and provides reduced antenna spacing with a simple, light-weight and inexpensive arrangement having an exposed reference antenna, a primary antenna surrounded by a dielectric material having a certain thickness and a ground plane that separates the two antennas. The predetermined thickness of the dielectric material surrounding the primary antenna depends upon the azimuthal angle around the antenna structure. Since the speed of RF is slowed down in a dielectric, the TDOA of the same RF wave front between the reference and primary antennas is directly related to the RF wave's Angle of Arrival (AoA).

Accordingly, it is an object of the present invention to provide a simpler direction-finding co-linear antenna apparatus.

It is another object of the present invention to provide a simpler, less costly and less cumbersome direction-finding co-linear antenna apparatus.

It is still another object of the present invention to provide a simpler, less costly and more compact direction-finding co-linear antenna system composed of a reference antenna and primary antenna separated by a ground plane with the primary antenna surrounded by a dielectric material.

It is still a further object of the present invention to provide a method for direction finding with a co-linear antenna.

These and other objects and advantages are accomplished by this invention's direction-finding co-linear antenna apparatus comprising an exposed reference antenna aligned collinearly with a primary antenna that is surrounded by a dielectric sleeve with a predetermined thickness with the reference and primary antennas being separated by a ground plane. This invention's direction-finding co-linear antenna system provides a simple, light-weight and inexpensive arrangement that answers the long-felt need for a direction-finding antenna system with fewer antennas and reduced antenna spacing that avoids unwanted detection because its smaller electronic "footprint" consists of the area of a single antenna plus a few inches of dielectric material in the sleeves rather than four widely spaced antennas positioned in an array. In accordance with the present invention, the antenna can be a monopole, dipole, or any antenna that is omnidirectional in the azimuthal plane. This invention's direction-finding co-linear antenna apparatus also provides the advantages of less expense, less weight, a simpler radome design and less wind drag, which is especially critical in airborne applications. Another advantage of the present invention is that it requires less processing by back-end electronics because one only needs to address the RF from two antennas rather than the four or five antenna array arrangements found in the prior art. The present invention also encompasses a method for determining the unknown location of a signal transmission source with a co-linear direction-finding antenna.

DETAILED DESCRIPTION OF THE DRAWINGS

Figure 1:
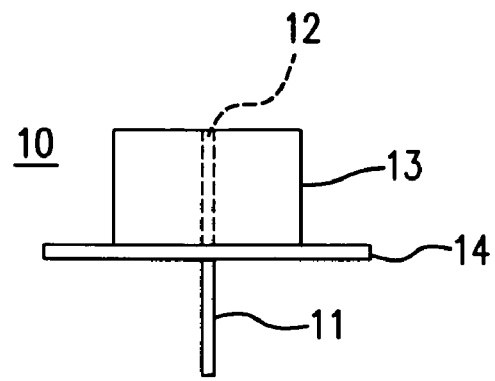
FIG. 1 is a cross-sectional side view of the co-linear direction-finding (DF) antenna apparatus of the present invention.

Referring now to the drawings, FIG. 1 is a cross-sectional side view of the co-linear direction-finding (DF) antenna 10, comprising a reference antenna 11, a primary antenna 12 that co-linearly opposes the reference antenna 11 and a dielectric sleeve 13 surrounding the primary antenna 12. A ground plane 14 physically supports both antennas 11 and 12 and is orthogonally positioned between each of them. The dielectric sleeve 13 is configured as a spiral with a thickness that is related to the azimuthal angle of arrival (AoA) around the primary antenna 12. The primary 12 and reference 11 antennas of co-linear DF antenna 10 are coupled to a means for detecting a time difference of arrival or phase difference, not shown in this drawing, which can be made from standard commercially available TDOA electronics such as Gilbert Cells, phase locked loops (PLLs) or discrete components. The base of each antenna 11 and 12 is electrically isolated from ground plane 14. Reference antenna 11 and primary antenna 12 are both omnidirectional antennas.

Figure 2:
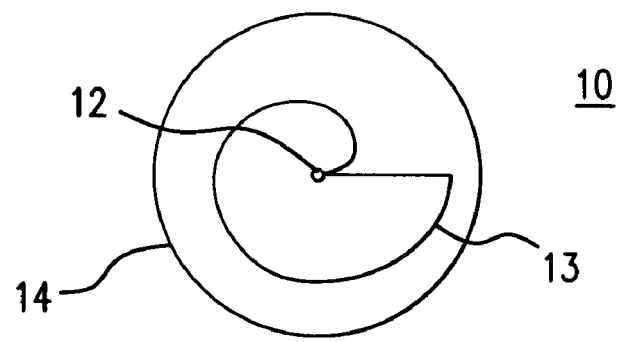
FIG. 2 is a top view of the co-linear DF antenna apparatus of the present invention.
Figure 3:
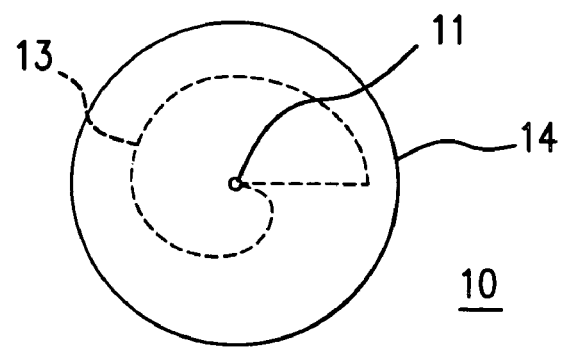
FIG. 3 is a cross-sectional bottom view of the co-linear DF antenna apparatus of the present invention.
Figure 4:
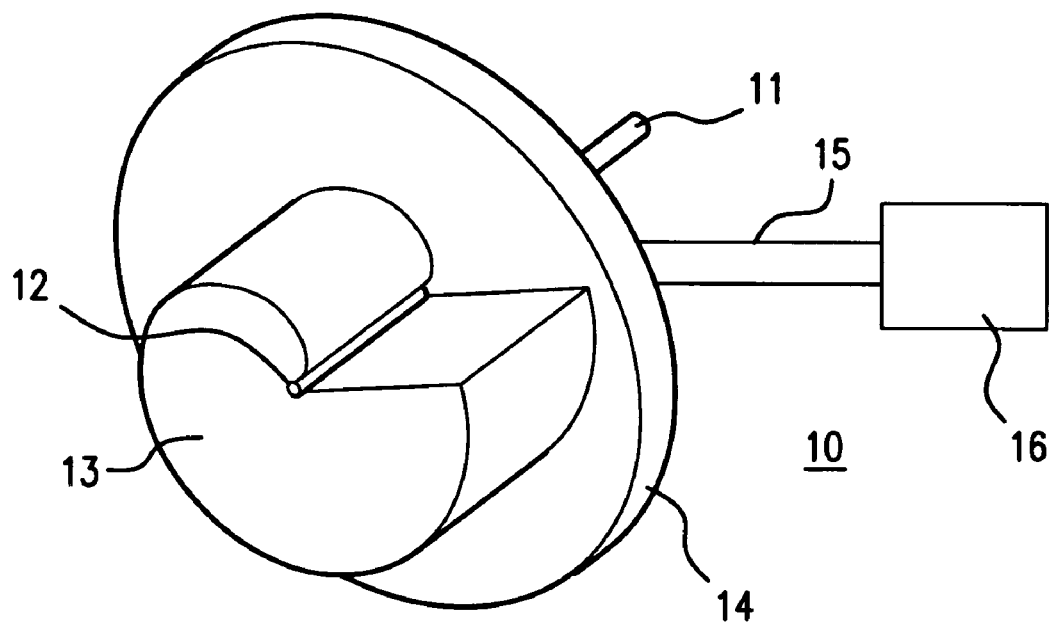
FIG. 4 is a perspective view of the co-linear DF antenna apparatus of the present invention.

FIG. 2 is a top view of the co-linear DF antenna 10 of the present invention depicting the primary antenna 12 surrounded by the spiral dielectric sleeve 13. The primary antenna 12 and spiral dielectric sleeve 13 are disposed on top of the ground plane 14. FIG. 3 shows a cross-sectional bottom view of the co-linear DF antenna 10 of the present invention showing the reference antenna 11 in the center of ground plane 14, with the location of the spiral dielectric sleeve 13 on the top of the ground plane 14, indicated by broken lines in this drawing. FIG. 4 is a perspective view of co-linear DF antenna 10 of the present invention connected by wires 15 to standard commercially available electronic monitors 16.

In operation, and referring back to FIG. 1, this invention's co-linear DF antenna 10 is shown oriented to receive a vertically polarized RF wave, and FIG. 2 shows the spiral dielectric sleeve 13 with a thickness that varies in a specific fashion depending on the azimuthal angle around the structure. Locating the co-linear DF antenna 10 in the vicinity of a transmission signal from a source at an unknown location generates a reference antenna radio frequency and a primary antenna radio frequency. The dielectric sleeve 13 causes a delayed primary antenna frequency. The detecting means monitors and compares the reference antenna radio frequency and the delayed primary antenna radio frequency to establish a time of arrival delay, or phase delay, for the delayed primary antenna frequency, thus determining the bearing to the unknown transmitter location.

One can use a number of different spirals. An Archimedean Spiral is given by the simple relationship between radius and polar angle of:

$$r = \alpha \Theta^{1/n} \quad \text{Equation (1)}$$

where r is the radius to the outer edge of dielectric 13, α is a proportionality constant, Θ is the polar angle and n is a constant that determines how tightly the spiral is wound and also the subtype of the spiral. The Table below shows the spiral subtype for a number of different n:

| Spiral Subtype   | N  |
|------------------|----|
| Lituus           | −2 |
| Hyperbolic Spiral| −1 |
| Archimedes Spiral| 1  |
| Fermat Spiral    | 2  |

The co-linear DF antenna 10 depicted and disclosed in the drawings uses n=2, which is a Fermat Spiral, for the outer profile of spiral-shaped dielectric sleeve 13, but n=1 or −1 are also possible choices, depending upon the desired implementation.

In accordance with the present invention, the basic antenna function relies on the fact that electromagnetic radiation travels slower through a dielectric material than it would in free space: the higher the dielectric constant, the slower the speed. This relationship is given by the equation:

$$v = \frac{c}{n} = \frac{c}{\sqrt{\varepsilon_r \mu_r}} \quad \text{Equation (2)}$$

where v is the velocity of the RF wave, c is the speed of light in a vacuum, n is the index of refraction, $\varepsilon_r$ is the relative dielectric constant and $\mu_r$ is the relative permeability, which is very close to 1 for a typical dielectric. This is also equivalent to a phase delay, thus comparing the phase delay, or the time of arrival delay, between the primary antenna 12 and reference antenna 11 provides the AoA in accordance with the present invention.

Figure 5:
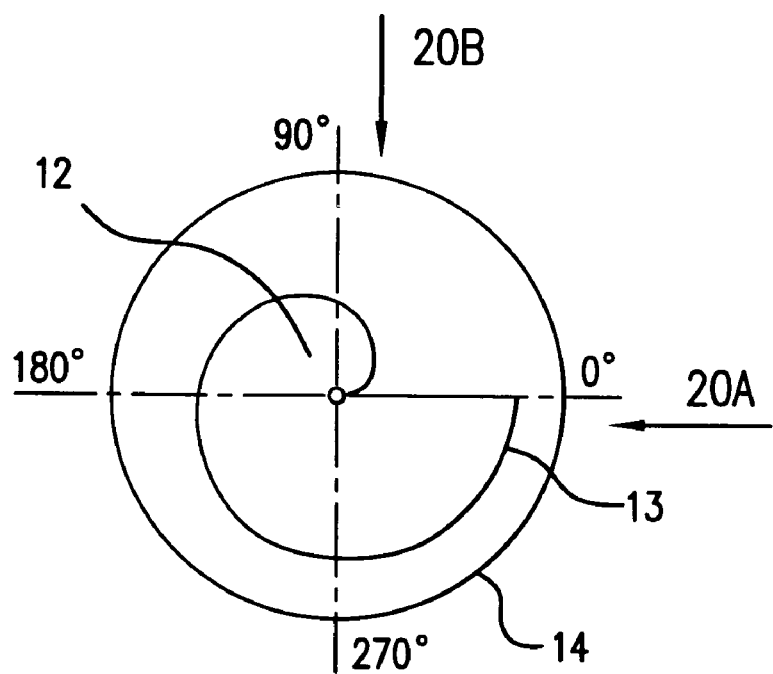
FIG. 5 depicts a compass rose superimposed on a top view of the co-linear DF antenna apparatus of the present invention.

This underlying operating principles of this invention's co-linear DF antenna are illustrated in FIG. 5, which depicts a compass rose superimposed on a top view of the co-linear DF antenna 10 with an RF wave, represented by arrow 20A, arriving from the 0° direction and a second RF wave 20B, arriving from the 90° direction. In this case, the 0° RF wave 20A is traversing free space and not passing through the spiral dielectric sleeve 13 before reaching the reference and primary antennas 11 and 12, so that the TDOA between the two antennas would be zero, and the phase shift would also be zero, i.e. there is no time difference of arrival for arrow 20A. When the 90° RF wave 20B arrives from the 90° direction, its arrival at the primary antenna 12 would be delayed slightly compared to its arrival at the reference antenna 11. Since the total delay is unique to a particular angle based upon the thickness of spiral dielectric sleeve 13, the AoA can then be unambiguously determined. Similarly, any signals arriving from the 180°, 270° or other directions, not shown in this drawing, would be delayed for even longer time periods because the signals are passing through thicker and thicker portions of spiral dielectric sleeve 13.

By contrast, in a prior art multiple antenna array TDOA or interferometric direction-finding system, the arriving RF plane wave hits some antennas in the array before hitting others. A key disadvantage with the interferometric technique is that antenna spacing depends upon the longest RF wavelength being detected, which can be prohibitively large in the lower VHF band. Also, in TDOA systems the antennas spacing is determined by the minimum detectable time difference and therefore the antenna spacing can again be prohibitive. By using two coaxial antennas that are separated by a ground plane, in accordance with this invention, the reference antenna 11 is a simple exposed antenna, while the primary antenna 12 is surrounded by the spiral dielectric sleeve 13 that slows the speed of the RF through the dielectric, making the TDOA of the same RF wave front between the reference and primary antennas 11 and 12 directly related to the AoA of the RF wave based upon the simple relationship between the dielectric constant and the speed of electromagnetic radiation shown in Equation 2 above. Although the drawings depict a system with two coaxial monopole antennas separated by a ground plane, the present invention also contemplates using other omnidirectional antenna such as dipoles instead of monopoles.

Just as a normal antenna performs optimally in a certain band, so too would this invention's co-linear DF antenna 10. Parameters such as the dielectric constant, maximum dielectric thickness and antenna length may also be adjusted for trade-offs between angular resolution, weight, antenna diameter and operating frequency band. As an example, if one desires the most precise angular precision possible and is not concerned with overall system diameter or weight, a low dielectric constant material could be used. A typical dielectric material for the spiral dielectric sleeve 13 could be Teflon®, which has low RF losses, i.e. a loss tangent of 0.0028@3 GHz, a moderate dielectric constant (2.1) and can be easily shaped and machined into the complex spiral shape. Other suitable dielectric materials or metamaterials can also be used for the spiral dielectric sleeve 13.

An additional feature of this invention is that multiple co-linear DF antenna systems can be deployed in a widely spaced area to obtain intersecting AoA and therefore determine the geographic location of a RF emitter rather than a simple DF. This invention can be used for many different military and civilian uses numerous such as signals intelligence, direction-finding for friend or foe; whether airborne or ground, locate a ship in distress. In the civilian sector, law enforcement can use it for tracking stolen vehicles and regulatory agencies, such as the FCC, can use it to track down illegal or interfering transmitters. In accordance with the present invention, the antenna can be either the monopole or omnidirectional type of antenna, and the omnidirectional antenna can also be a dipole antenna. The present invention is especially well-suited for, but not limited to, the VHF and UHF RF bands.

Other variations include the size, shape, configuration and position of the dielectric sleeve 13, the type of spiral employed and selecting either the monopole or omnidirectional antenna. The present invention also encompasses a co-linear direction-finding antenna system and many variations of the antenna embodiment also apply to the co-linear direction-finding antenna system.

The present invention also contemplates a method for determining the unknown location of a signal transmission source with a co-linear direction-finding antenna. The method for determining the unknown location of a signal transmission source with a co-linear direction-finding antenna comprises the steps of forming a reference antenna with a reference antenna base; forming a primary antenna with a primary antenna base; aligning the primary antenna to co-linearly oppose the reference antenna; forming a dielectric sleeve with a predetermined thickness related to an azimuthal angle around the primary antenna; forming a ground plane; positioning the ground plane in an orthogonal orientation to support the reference antenna and the primary antenna and electrically separate them; allowing the reference antenna to receive a reference antenna radio frequency from the signal transmission source; and allowing the primary antenna to receive a primary antenna radio frequency. The method continues with the steps of causing a delayed primary antenna frequency when the primary antenna radio frequency penetrates the dielectric sleeve; monitoring the reference antenna radio frequency and the delayed primary antenna radio frequency with a means for detecting a time difference of arrival; comparing the reference antenna radio frequency and the delayed primary antenna radio frequency with the detecting means to establish a time of arrival delay of the delayed primary antenna frequency and provide an Angle of Arrival for the delayed primary antenna frequency; and determining the unknown location without emitting a detectable electronic signature. Many of the variations of the co-linear direction-finding antenna and co-linear direction-finding antenna system also apply to this invention's method.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention. Accordingly, the present invention should not be limited by the foregoing description, but only by the appended claims.

What we claim is:

1. A co-linear direction-finding antenna, comprising:
a reference antenna having a reference antenna base;
a primary antenna that co-linearly opposes said reference antenna, said primary antenna having a primary antenna base;
a dielectric sleeve is positioned around said primary antenna;
said reference antenna and said primary antenna being supported and electrically separated by a ground plane orthogonally positioned therebetween;
a transmission signal from a source at an unknown location generates a reference antenna radio frequency and a primary antenna radio frequency;
said dielectric sleeve, having a predetermined thickness related to an azimuthal angle around said primary antenna, causes a delayed primary antenna frequency; and
a means for detecting a time difference of arrival monitors and compares said reference antenna radio frequency and said delayed primary antenna radio frequency to establish a time of arrival delay of said delayed primary antenna frequency, provide an Angle of Arrival for said delayed primary antenna frequency and determine said unknown location, without emitting a detectable electronic signature.

2. The co-linear direction-finding antenna, as recited in claim 1, further comprising said reference antenna being uncovered and fully exposed to said transmission signal.

3. The co-linear direction-finding antenna, as recited in claim 2, further comprising said dielectric sleeve being configured into a spiral shape.

4. The co-linear direction-finding antenna, as recited in claim 3, further comprising said reference antenna and said primary antenna each being an omnidirectional antenna.

5. The co-linear direction-finding antenna, as recited in claim 4, further comprising said spiral being selected from the group of spirals consisting of a Lituus spiral, a hyperbolic spiral, an Archimedes spiral and a Feremat spiral.

6. The co-linear direction-finding antenna, as recited in claim 5, further comprising said dielectric sleeve leaving an uncovered portion of said primary antenna.

7. The co-linear direction-finding antenna, as recited in claim 6, further comprising said spiral being said Feremat spiral.

8. A co-linear direction-finding antenna system, comprising:
   a reference antenna having a reference antenna base;
   a primary antenna that co-linearly opposes said reference antenna, said primary antenna having a primary antenna base;
   said reference antenna and said primary antenna each being an omnidirectional antenna;
   a dielectric sleeve is positioned around said primary antenna;
   said reference antenna and said primary antenna being supported and electrically separated by a ground plane orthogonally positioned therebetween;
   a transmission signal from a source at an unknown location generates a reference antenna radio frequency and a primary antenna radio frequency;
   said dielectric sleeve, having a predetermined thickness related to an azimuthal angle around said primary antenna, and being configured into a spiral shape causes a delayed primary antenna radio frequency;
   said dielectric sleeve leaving an uncovered portion of said primary antenna;
   a means for detecting a time difference of arrival is coupled to said reference antenna and said primary antenna; and
   said detecting means monitors and compares said reference antenna radio frequency and said delayed primary antenna radio frequency to establish a time of arrival delay of said delayed primary antenna frequency, provide an Angle of Arrival for said delayed primary antenna frequency and determine said unknown location, without emitting a detectable electronic signature.

9. The co-linear direction-finding antenna system, as recited in claim 8, further comprising said reference antenna being uncovered and fully exposed to said transmission signal.

10. The co-linear direction-finding antenna system, as recited in claim 9, further comprising said reference antenna and said primary antenna being positioned in a central region of a top surface of said ground plane.

11. The co-linear direction-finding antenna system, as recited in claim 10, further comprising said spiral being selected from the group of spirals consisting of a Lituus spiral, a hyperbolic spiral, an Archimedes spiral and a Feremat spiral.

12. The co-linear direction-finding antenna system, as recited in claim 11, further comprising said spiral being said Feremat spiral.

13. A method for determining the unknown location of a signal transmission source with a co-linear direction-finding antenna, comprising the steps of:
   forming a reference antenna with a reference antenna base;
   forming a primary antenna with a primary antenna base;
   aligning said primary antenna to co-linearly oppose said reference antenna;
   forming a dielectric sleeve with a predetermined thickness related to an azimuthal angle around said primary antenna;
   forming a ground plane;
   positioning said ground plane in an orthogonal orientation to support said reference antenna and said primary antenna and electrically separate said reference antenna from said primary antenna;
   allowing said reference antenna to receive a reference antenna radio frequency from said transmission signal source;
   allowing said primary antenna to receive a primary antenna radio frequency;
   causing a delayed primary antenna frequency when said primary antenna radio frequency penetrates said dielectric sleeve;
   monitoring said reference antenna radio frequency and said delayed primary antenna radio frequency with a means for detecting a time difference of arrival;
   comparing said reference antenna radio frequency and said delayed primary antenna radio frequency with said detecting means to establish a time of arrival delay of said delayed primary antenna frequency and provide an Angle of Arrival for said delayed primary antenna frequency; and
   determining said unknown location without emitting a detectable electronic signature.

14. The method for determining the unknown location of the signal transmission source with the co-linear direction-finding antenna, as recited in claim 13, further comprising the step of allowing said reference antenna to be fully exposed to said transmission signal.

15. The method for determining the unknown location of the signal transmission source with the co-linear direction-finding antenna, as recited in claim 14, further comprising the step of configuring said dielectric sleeve into a spiral shape.

16. The method for determining the unknown location of the signal transmission source with the co-linear direction-finding antenna, as recited in claim 15, wherein said reference antenna and said primary antenna are each an omnidirectional antenna.

17. The method for determining the unknown location of the signal transmission source with the co-linear direction-finding antenna, as recited in claim 16, further comprising the step of positioning said reference antenna and said primary antenna in a central region of a top surface of said ground plane.

18. The method for determining the unknown location of the signal transmission source with the co-linear direction-finding antenna, as recited in claim 17, further comprising the step of selecting said spiral from the group of spirals consisting of a Lituus spiral, a hyperbolic spiral, an Archimedes spiral and a Feremat spiral.

19. The method for determining the unknown location of the signal transmission source with the co-linear direction-finding antenna, as recited in claim 18, further comprising the step of forming said dielectric sleeve to leave an uncovered portion of said primary antenna.

20. The method for determining the unknown location of the signal transmission source with the co-linear direction-finding antenna, as recited in claim 19, wherein said spiral is said Feremat spiral.

* * * * *